United States Patent
Childress et al.

(10) Patent No.: US 11,824,794 B1
(45) Date of Patent: Nov. 21, 2023

(54) DYNAMIC NETWORK MANAGEMENT BASED ON PREDICTED USAGE

(71) Applicant: Kyndryl, Inc., New York, NY (US)

(72) Inventors: Rhonda L. Childress, Austin, TX (US); Jeremy R. Fox, Georgetown, TX (US); Michael Bender, Rye Brook, NY (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/749,403

(22) Filed: May 20, 2022

(51) Int. Cl.
- H04L 47/762 (2022.01)
- G06N 20/00 (2019.01)
- H04L 47/70 (2022.01)
- H04L 47/78 (2022.01)

(52) U.S. Cl.
CPC ........... *H04L 47/762* (2013.01); *G06N 20/00* (2019.01); *H04L 47/781* (2013.01); *H04L 47/822* (2013.01)

(58) Field of Classification Search
CPC ... H04L 47/762; H04L 47/781; H04L 47/822; H04L 41/16; G06N 20/00; H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 7,983,272 B2 | 7/2011 | Carlson et al. | |
| 8,589,481 B2* | 11/2013 | Das | H04L 69/329 709/219 |
| 9,864,620 B2 | 1/2018 | Barabash et al. | |
| 10,892,959 B2 | 1/2021 | de Lima et al. | |
| 2014/0173098 A1 | 6/2014 | Bartfai-Walcott et al. | |
| 2018/0365581 A1* | 12/2018 | Vasseur | H04L 43/045 |
| 2019/0130327 A1 | 5/2019 | Carpenter et al. | |
| 2020/0210965 A1* | 7/2020 | Garber | G06Q 10/0633 |

(Continued)

FOREIGN PATENT DOCUMENTS

WO 2013052649 4/2013

OTHER PUBLICATIONS

Mell et al., "The NIST Definition of Cloud Computing", NIST, Special Publication 800-145, Sep. 2011, 7 pages.

(Continued)

*Primary Examiner* — Michael Won
(74) *Attorney, Agent, or Firm* — Erik Swanson; Andrew M. Calderon; Calderon Safran & Cole, P.C.

(57) ABSTRACT

A system and method for bandwidth management are provided. In embodiments, a method includes: training, by a computing device, a predictive machine learning (ML) model based on historic network usage data of software applications in a cloud environment and historic business context data; assigning, by the computing device, priority rankings to software application activities of the cloud environment using the predictive ML model based on predicted resource requirements for the software application activities of the cloud environment and predicted contextual scenarios that impact the predicted resource requirements using an input of real-time network usage data of the cloud environment and real-time business context data; and initiating, by the computing device, scheduling of the software application activities based on the priority rankings.

20 Claims, 7 Drawing Sheets

(56) References Cited

U.S. PATENT DOCUMENTS

| | | | |
|---|---|---|---|
| 2020/0411168 A1 | 12/2020 | Thomas et al. | |
| 2021/0011765 A1* | 1/2021 | Doshi | G06F 9/5083 |
| 2021/0182108 A1* | 6/2021 | Eberlein | G06F 11/301 |
| 2022/0222122 A1* | 7/2022 | Jasleen | G06F 9/5005 |
| 2022/0261661 A1* | 8/2022 | Khaligh | G06Q 10/0631 |
| 2022/0345931 A1* | 10/2022 | Svennebring | H04W 28/0268 |
| 2023/0021435 A1* | 1/2023 | Menon | H04W 84/12 |

OTHER PUBLICATIONS

Harder, "Pulling from vs. Pushing to the Cloud", https://www.astroarch.com/tvp_strategy/pulling-vs-pushing-cloud-39218/, Oct. 20, 2016, 5 pages.

Anonymous, "What is cloud migration? | Cloud migration strategy", https://www.cloudflare.com/learning/cloud/what-is-cloud-migration/, accessed Apr. 13, 2022, 7 pages.

* cited by examiner

DYNAMIC NETWORK MANAGEMENT BASED ON PREDICTED USAGE

BACKGROUND

Aspects of the present invention relate generally to computer network management and, more particularly, to dynamic management of activities in a cloud environment(s) based on predicted network usage.

In general, cloud migration is the process of moving digital business operations data into the cloud. The term "the cloud" refers to servers that are accessed over the Internet, and the resources (e.g., software and databases) that run on those servers. Cloud migration is similar to moving a physical data center, except that cloud migration involves moving data, software applications, and information technology (IT) processes from at least one data center, usually a dedicated enterprise data center, to one or more other data centers, rather than physically moving data center devices. Much like a move from a smaller office to a larger one, cloud migration requires significant preparation and advanced work, but pays dividends in the form of cost savings and greater flexibility. Most often, the term "cloud migration" describes the move from on-premises or legacy infrastructure to the cloud. However, the term "cloud migration" can also apply to a migration from one cloud environment to another cloud environment. After software applications are migrated to a cloud environment, utilization of the software applications by participants in the cloud environment requires data to be pushed to a cloud server or pulled from the cloud server.

Service providers that provide services to clients in a cloud environment generally have service level agreements (SLAs) with those clients. An SLA is a legally binding contract between a service provider and one or more clients that defines the specific terms and agreements governing the duration of the service engagement (i.e., when the client is paying for the services and the provider is obligated to deliver them). Particular aspects of service are generally defined by the SLA, including quality, availability, and responsibilities, for example.

SUMMARY

In a first aspect of the invention, there is a computer-implemented method including: training, by a computing device, a predictive machine learning (ML) model based on historic network usage data of software applications in a cloud environment and historic business context data; assigning, by the computing device, priority rankings to software application activities of the cloud environment using the predictive ML model based on predicted resource requirements for the software application activities of the cloud environment and predicted contextual scenarios that impact the predicted resource requirements using an input of real-time network usage data of the cloud environment and real-time business context data; and initiating, by the computing device, scheduling of the software application activities based on the priority rankings.

In another aspect of the invention, there is a computer program product including one or more computer readable storage media having program instructions collectively stored on the one or more computer readable storage media. The program instructions are executable to: obtain historic business context data from one or more remote sources; train a predictive machine learning (ML) model based on historic network usage data of software applications in a cloud environment and the historic business context data; dynamically predict network bandwidth requirements for software application activities of the cloud environment and a duration of the predicted network bandwidth requirements using the predictive ML model based on an input of real-time network usage data of the cloud environment; predict one or more contextual scenarios that impact the predicted network bandwidth requirements using the predictive ML model based on an input of real-time business context data; assign priority rankings to the software application activities based on the predicted network bandwidth requirements, the duration of the predicted network bandwidth requirements, and the predicted contextual scenarios using the predictive ML model; and initiate scheduling of the software application activities based on the priority rankings.

In another aspect of the invention, there is system including a processor, a computer readable memory, one or more computer readable storage media, and program instructions collectively stored on the one or more computer readable storage media. The program instructions are executable to: obtain historic business context data from one or more remote sources; train a predictive machine learning (ML) model based on historic network usage data of software applications in a cloud environment and the historic business context data; dynamically predict network bandwidth requirements for software application activities of the cloud environment and a duration of the predicted network bandwidth requirements based on the predictive ML model, during an ongoing data migration event within the cloud environment, using an input of real-time network usage data of the cloud environment; predict one or more contextual scenarios that impact the predicted network bandwidth requirements based on the predictive ML model using an input of real-time business context data; assign priority rankings to the software application activities based on the predicted network bandwidth requirements, the duration of the predicted network bandwidth requirements, and the predicted contextual scenarios using the predictive ML model; and dynamically initiate scheduling of the software application activities during the ongoing data immigration event based on the priority rankings

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
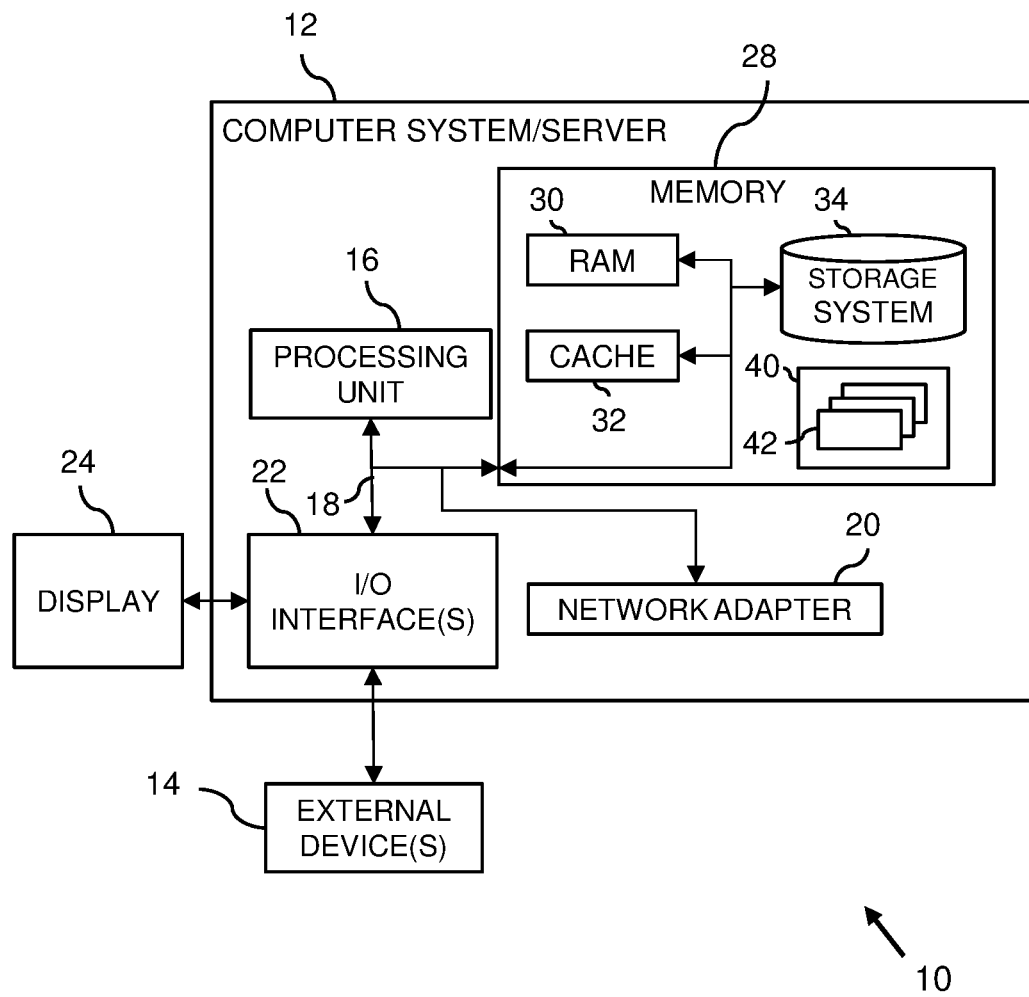
FIG. 1 depicts a cloud computing node according to an embodiment of the present invention.

Aspects of the present invention relate generally to computer network management and, more particularly, to dynamic management of software activities in a cloud environment(s) based on predicted network usage. Embodiments of the invention provide an artificial intelligence (AI) enabled method and system that predicts Internet bandwidth consumption related to software application data migration activity (e.g., pushing to or pulling from a cloud server), and identifies how the predicted Internet bandwidth consumption will impact service level agreements (SLAs) associated with one or more software applications, including determining penalties for any anticipated failures to meet SLA targets.

In embodiments, a system dynamically prioritizes cloud-related software application activities, so that available bandwidth and participant SLAs can be addressed in an appropriate manner to ensure critical data feeds are completed, thus ensuring that critical business functions are completed, and critical SLA targets are met. In implementations, dynamic prioritization can occur during data migrations when changes in Internet bandwidth consumption are more fluid, and/or may occur in advance of cloud migration activities, so that changes in bandwidth availability do not negatively impact the fulfillment of SLAs.

Both pushing data to, or pulling data from, a cloud environment requires Internet bandwidth and network connectivity. Usually, at least one SLA is associated with each software application hosted in the cloud environment, and includes various targets such as availability targets for an application, performance metric thresholds, etc. In this case, the ability for the cloud environment to meet the requirements of an SLA depends on the available Internet bandwidth. Accordingly, there is a need for proper SLA and bandwidth management, including prioritization of the critical data feeds. This need is especially important when multiple data feeds are scheduled to occur during a migration window.

Current solutions for Quality of Service (QoS) management depend on predefining various components in a QoS system. AI processes may be applied to various components of QoS management; however, during a migration of software applications to a cloud environment, the components or parameters impacting QoS will rapidly change during the migration and after migration, until finally stabilizing sometime after the migration.

Advantageously, embodiments of the invention provide a method and system by which dynamic prioritization of software applications can be done during cloud migration, which considers SLA targets, available Internet bandwidth, and the impact of migrating different portions of data on business continuity. Moreover, implementations of the invention consider the vector of time (e.g., time of day, day of the week, etc.). In one example, the failure of a software application to process funds for all financial institutions of a user through a single bank on a Friday may have extensive negative repercussions, such that the vector of timing for this application action is critical.

In implementations, a method of allocating resources among a plurality of system applications (software applications) includes: determining computer resource requirements for a plurality of system applications using collected requirement data associated with the system applications; identifying a plurality of contextual scenarios based on collected attribute metadata associated with system application use patterns; applying an AI model (machine learning model) trained to use the contextual scenarios and the resource requirements to assign a priority ranking for the system applications; identifying a set of resources available to the system applications; and allocating the set of resources according to the priority ranking (e.g., through scheduling of application activities). In embodiments, the priority ranking is based, at least in part, on SLA performance level requirements and financial impact values (e.g., financial impact values associated with failure to meet SLA targets).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
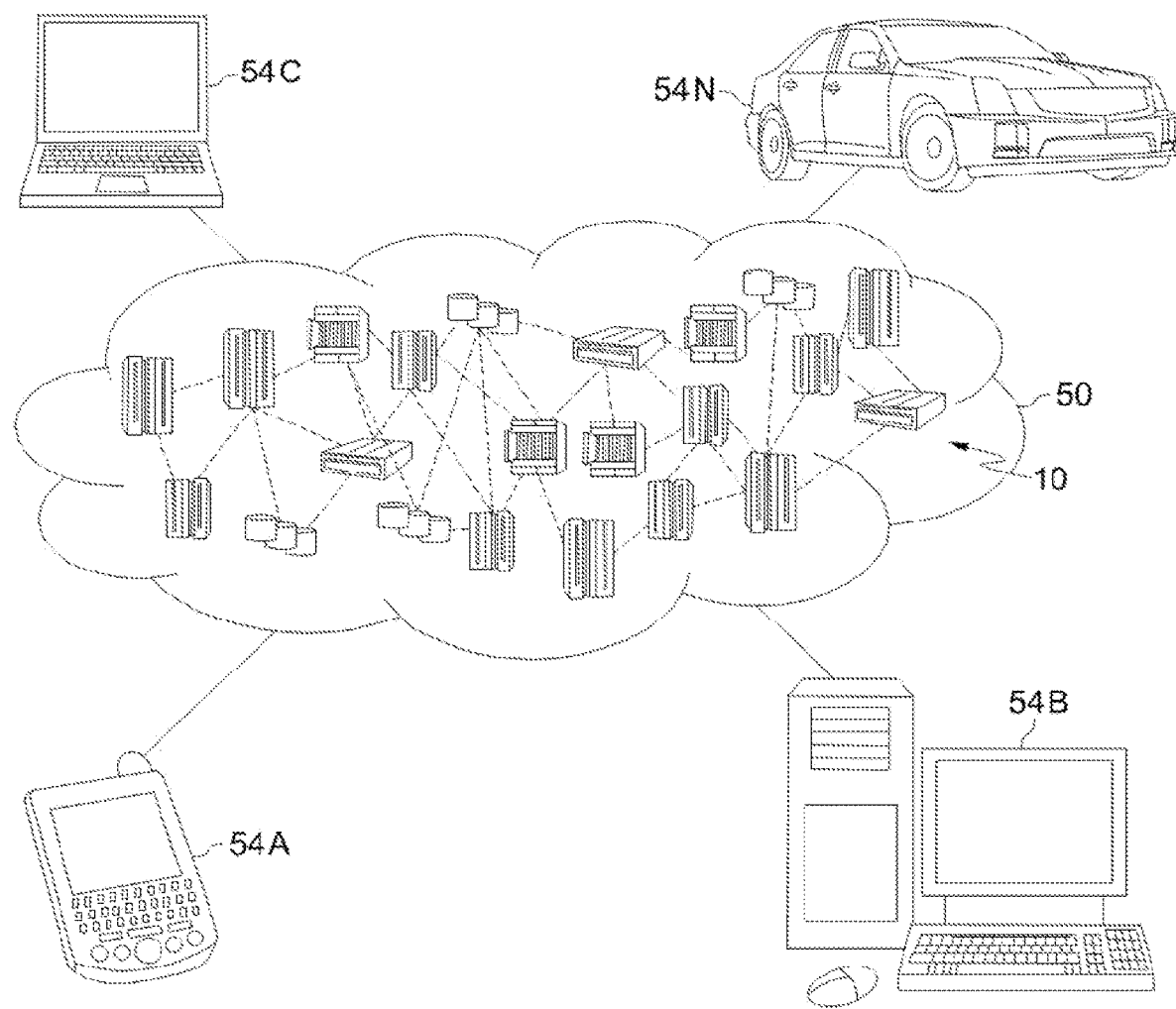
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
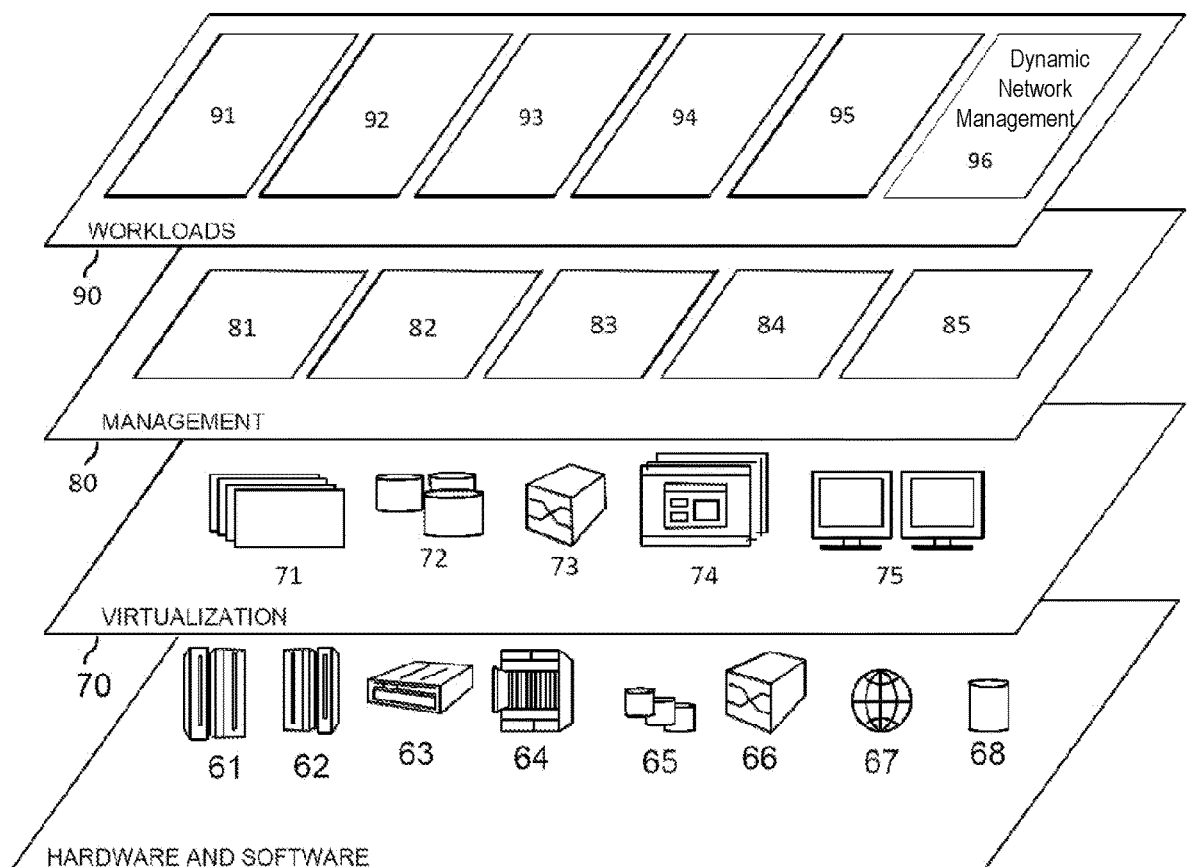
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic network management 96.

Implementations of the invention may include a computer system/server 12 of FIG. 1 in which one or more of the program modules 42 are configured to perform (or cause the computer system/server 12 to perform) one of more functions of the dynamic network management 96 of FIG. 3. For example, the one or more of the program modules 42 may be configured to: obtain historic business context data from one or more remote sources (e.g., remote computer devices); train a predictive machine learning (ML) model based on historic network usage data of software applications in a cloud environment and the historic business context data; dynamically predict network bandwidth requirements for software application activities of the cloud environment and a duration of the predicted network bandwidth requirements from the predictive ML model based on an input of real-time network usage data of the cloud environment; predict one or more contextual scenarios that impact the resource requirements from the predictive ML model using an input of real-time business context data; assign priority rankings to the software application activities based on the predicted resource requirements, the duration of the predicted resource requirements, and the predicted contextual scenarios using the predictive ML model; and initiate scheduling of the software application activities based on the priority rankings.

Figure 4:
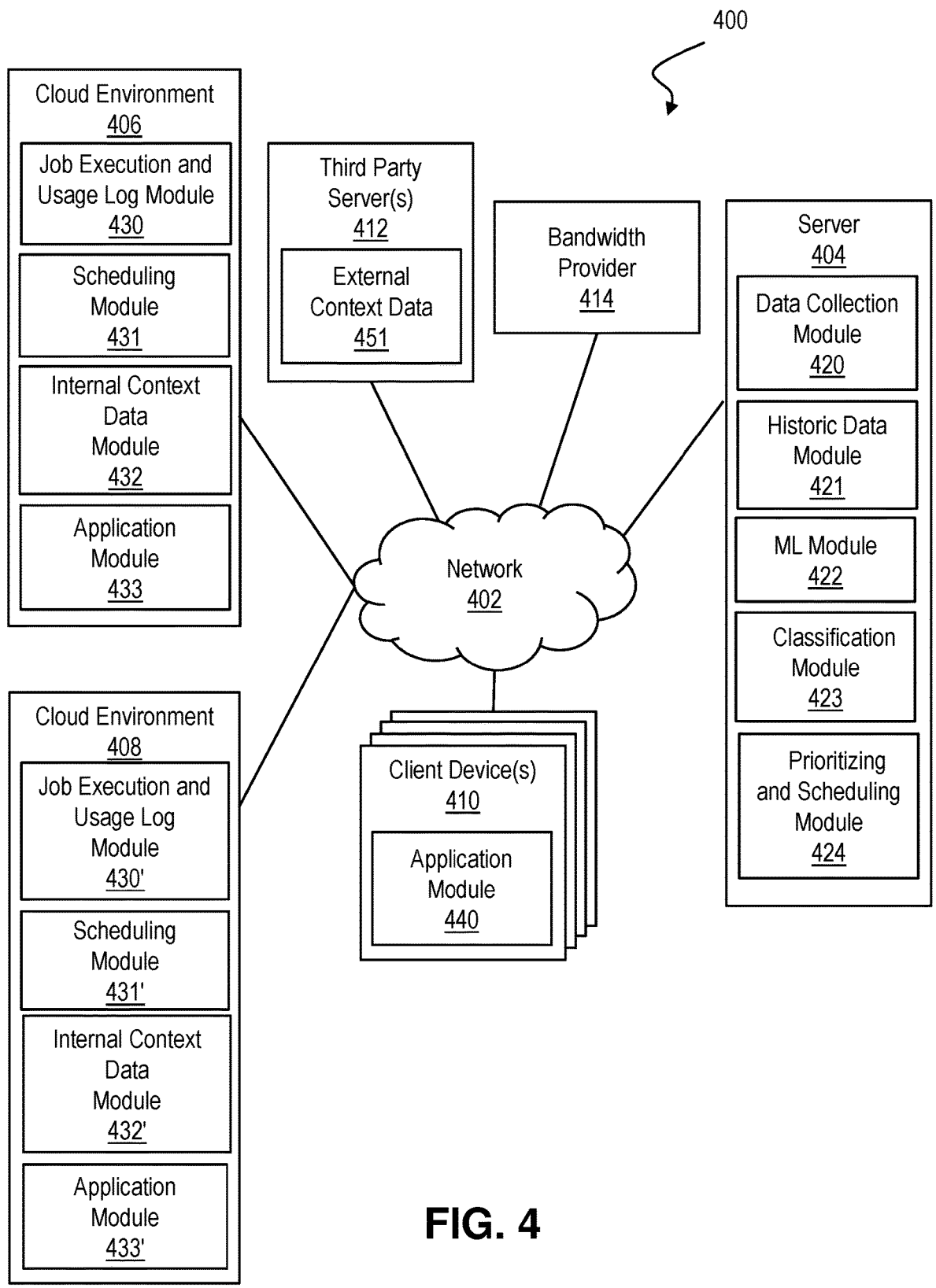
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 402 enabling communication between one or more of: a server 404, a cloud environment 406, a cloud environment 408, one or more client devices 410, one or more third party servers 412, and a bandwidth provider 414. The server 404, the cloud environment 406, the cloud environment 408, the one or more client devices 410, the one or more third party servers 412, and the bandwidth provider 414 may be nodes 10 in the cloud computing environment 50 of FIG. 2, and may each comprise the computer system/server 12 of FIG. 1, or elements thereof.

In implementations, the one or more client devices 410 are local computing devices used by cloud consumers in the cloud computing environment 50 of FIG. 2 (e.g., PDA or cellular telephone 54A, desktop computer 54B, or laptop computer 54C). In embodiments, the server 404 is a cloud-based server in the cloud computing environment 50 configured to provide services to participants (e.g., providers of cloud-based services and/or providers of the cloud environments 406 and 408) in the environment 400 over the Internet.

In embodiments, the server 404 comprises one or more modules, each of which may comprise one or more program modules such as program modules 42 described with respect to FIG. 1. In the example of FIG. 4, the server 404 includes a data collection module 420, a historic data module 421, a machine learning (ML) module 422, a classification module 423, and a prioritizing and scheduling module 424, each of which may comprise one or more program module(s) 42 of FIG. 1, for example.

In implementations, the data collection module 420 is configured to: collect historic network usage data for participating cloud environments (e.g., cloud environments 406 and 408); process the historic network usage data to extract or generate quantifiable usage parameter data; obtain internal context data from participating cloud environments; obtain external context data from sources of data outside of the participating cloud environments; and obtain real-time network usage data for one or more participating cloud environments, where the real-time network usage data includes information regarding currently executed (ongoing) and/or scheduled application activities (e.g., data transfer activities). In implementations, the ongoing application activities include current or ongoing data migration activities (data push/pull events) within cloud environments 406 and/or 408.

In embodiments, the historic data module 421 is configured to store historic network usage data and/or quantifiable usage parameter data for use in iterative training of a predictive ML model of the ML module 422. In implementations, the ML module 422 is configured to generate and iteratively train the predictive ML model using data from the historic data module 421 and/or data from the data collection module 420, and assign priority rankings (e.g., priority levels) to application activities (e.g., application activities identified in real-time network usage data).

In embodiments, the classification module 423 is configured to assign/classify different application activities (e.g., from real-time network usage data) according to the type of activity. In implementations, the prioritizing and scheduling module 424 is configured to determine an order of execution of the ongoing or scheduled application activities based on assigned priority levels, and initiate remediation protocols to meet anticipated bandwidth requirements while avoiding breaches to participant SLAs.

In embodiments, the cloud environment 406 and the cloud environment 408 each comprise a network of computing resources utilized by one or more entities to perform data transfer activities between computing resources (e.g., servers, databases, etc.). In implementations, each cloud environment 406 and 408 provides software application services to one or more clients (e.g., via the client devices 410). In the example of FIG. 4, the cloud environment 406 includes: a job execution and usage log module 430 configured to log network usage information and provide real-time network usage data to the server 404; a scheduling module 431 configured to track and schedule application activities for one or more software applications on one or more computing devices; an internal context data module 432 configured to provide internal context data from the cloud environment 406 to the server 404; and an application module 433 configured to provide software application services to one or more client devices 410, each of which may comprise one or more program module(s) 42 of FIG. 1, for example. Cloud environment 408 includes corresponding modules 430', 431', 432' and 433' configured to perform the same functions as the respective modules 430-433 of the cloud environment 406, each of which may comprise one or more program module(s) 42 of FIG. 1, for example.

In embodiments, the one or more client devices 410 each include an application module 440 configured to communicate with one or more application modules 433 and 433', thus enabling participants to access application services of the respective cloud environments 406 and 408. The application module 440 may comprise one or more program module(s) 42 of FIG. 1, for example.

In implementations, the one or more third party servers 412 store external context data 451, and are configured to provide the external context data 451 to the server 404. The third party servers 412 may comprise social media servers, government servers, media servers, or other sources of business information. In embodiments, the bandwidth provider 414 is a provider of bandwidth services, and is configured to process resource requests (e.g., requests for more bandwidth) from the server 404 and/or the cloud environments 406 and 408.

The server 404, the cloud environment 406, the cloud environment 408, the one or more client devices 410, the one or more third party servers 412, and the bandwidth provider 414 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5A:
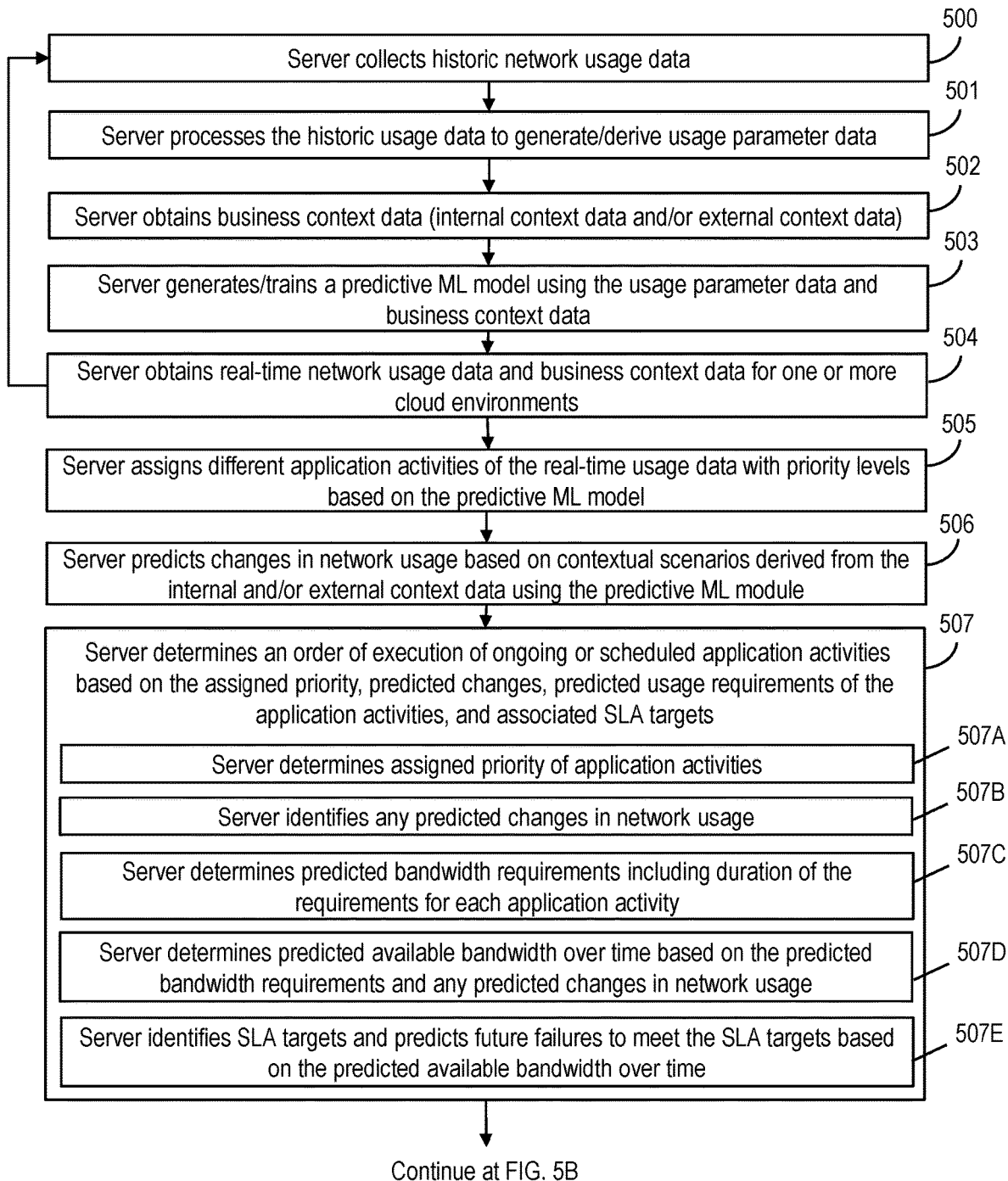
FIGS. 5A and 5B show a flowchart of an exemplary method in accordance with aspects of the invention.
Figure 5B:
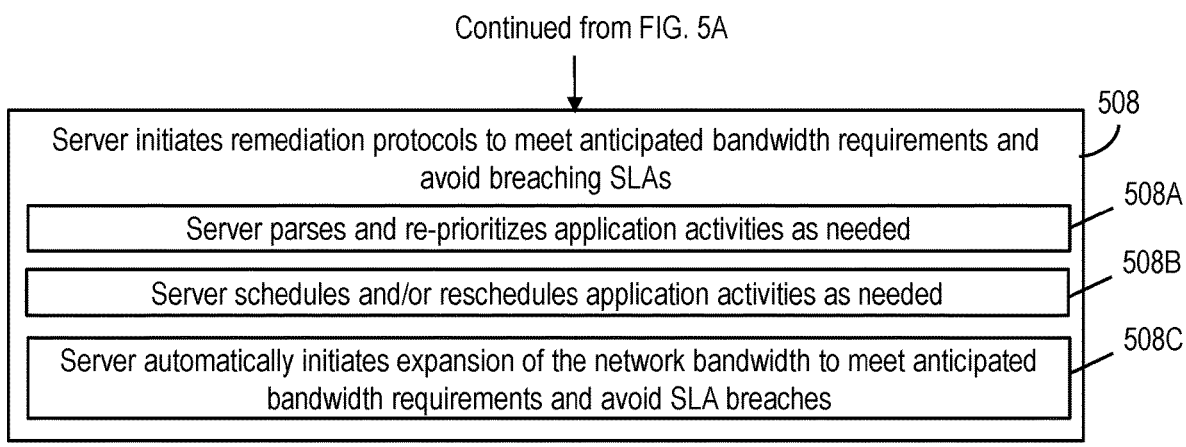

FIGS. 5A and 5B show a flowchart of an exemplary method in accordance with aspects of the present invention. Steps of the method may be carried out in the environment of FIG. 4 and are described with reference to elements depicted in FIG. 4.

With initial reference to FIG. 5A, at step 500, the server 404 collects historic network usage data from participating cloud environments (e.g., 406 and 408 of FIG. 4). In implementations, the historic network usage data includes data regarding different software applications hosted by the participating cloud environments (e.g., 406 and 408 of FIG. 4), and different application activities performed over time in the participating cloud environments (e.g., data migration), including computing resources utilized by the different application activities and SLA targets associated with the different applications and/or application activities. SLA targets may include, for example, timelines or deadlines associated with application activities, and thresholds for computing resources (e.g., data transfer thresholds). Data regarding computing resources may include volumes of data transferred (e.g., pushed or pulled from the cloud environments) and bandwidth used (e.g., for a particular application or application activity and/or loads on bandwidth over time). In implementations, the historic network usage data is collected continuously or periodically. In embodiments, real-time usage data collected at step 504 may be saved or archived with the historic network usage data in a historic data module 421 for use in iterative training a predictive ML model according to implementations of the invention. In embodiments, the data collection module 420 of the server 404 implements step 500.

At step 501, the server 404 processes the historic network usage data to extract or generate quantifiable usage parameter data. In implementations, the usage parameter data includes: bandwidth used; volumes of data transmitted (e.g., pushed or pulled) for different applications and/or application activities; computing resources (e.g., databases, servers, etc.) associated with the different application activities; SLA targets associated with the different applications and/or application activities; and timing of application activities (e.g., when data is pushing, elapsed time to push data under optimal conditions, etc.). In aspects of the invention, the usage parameter data includes data regarding penalties (e.g., financial costs) associated with failures to meet SLA targets. In implementations, the server 404 categorizes the usage parameter data (e.g., via the classification module 423), such that different categories are associated with different types of applications and/or application activities. In embodiments, the usage parameter data is determined for a plurality of participating cloud environments (e.g., 406 and 408 of FIG. 4). In other embodiments, the usage parameter data is determined for a single cloud environment. The extraction of quantifiable usage parameter data may occur on a continuous or periodic basis as new historic network usage data becomes available. In embodiments, the server 404 stores the usage parameter data in the historic data module 421 for use in training ML models in accordance with implementations of the invention. In embodiments, the data collection module 420 of the server 404 and/or the classification module 423 of the server 404 implements step 501.

At step 502, the server 404 obtains business context data comprising internal context data from respective participating cloud environments (e.g., 406 and 408 of FIG. 4) and/or external context data 451 from sources of data outside of the participating cloud environments (e.g., third party server(s) 412 or client device(s) 410). In embodiments, the server 404 classifies the internal and external context data 451 (e.g., business context data) into types or classes of data using the classification module 423. External context data 451 may be customer specific information, business information from various reputable sources, and/or external influencing factors that can have an influence on how priority of applications and/or application activities should be determined.

As an example, external data sources may include media reports, social networking information, government policies or rules and published reports. Internal context data sources may include, for example, future business plans, mergers, and acquisitions (M&A) information, competitor information, email analysis, information technology (IT) department data (e.g., software deployment, bug fixing, data migration, major software bug event, application outages, etc.), minutes of meetings, and personnel feedback. In implementations, the internal context data and external data are obtained continuously or periodically as real-time data (e.g., while one or more data migration events are occurring on one or more participating cloud environments). In embodiments, the data collection module 420 of the server 404 implements step 502.

At step 503, the server 404 generates and/or trains a predictive ML model using the historic usage data or usage parameter data and the business context data (e.g., internal context data and/or external context data 451) as training data. In implementations, the predictive ML model comprises a knowledge corpus of patterns or trends of network usage over time for one or more cloud environments. In embodiments, the knowledge corpus includes timing (e.g., how long a process takes) related to different types or categories of applications and/or application activities, volumes of data associated with different types or categories of applications and/or application activities, other application activities (jobs) running in parallel with a particular type or category of application activity, and SLA targets associated with each application activity.

In embodiments, the predictive ML model is configured to identify relationships between parameters, such that inputting real-time network usage data to the predictive ML model results in an output of network usage feedback. By way of example, the predictive ML model is trained to identify relationships between bandwidth usage, amounts of data transferred, types of application activities, time parameters (e.g., hour, month, date, time for data migrations), SLA compliance, SLA penalties, categories of business context data, contextual situations, and priority rankings. In embodiments, the predictive ML model is trained to assign priority ratings (e.g., priority levels) to application activities based on identified relationships between parameters that result in positive outcomes (e.g., meeting SLA targets and/or business continuity objectives) or negative outcomes (e.g., failing to meet SLA targets and/or business continuity objectives). In implementations, the predictive ML model is utilized to predict priority ratings (e.g., priority levels) for one or more application activities, bandwidth requirements for the one or more application activities, and/or time required for an application activity (e.g., time to pull or push data). In aspects of the invention, the predictive ML model identifies trends in bandwidth usage, including spikes in usage.

In embodiments, the predictive ML model is further trained to identify relationships or trends between particular internal or external context data 451 (e.g., business context data) and network usage parameters. In this way, the predictive ML model may be utilized to identify contextual scenarios that impact network usage. Impact may be determined based on network usage parameter values meeting or exceeding predetermined threshold values in stored threshold rules. In one example, the predictive ML model identifies spikes in network bandwidth usage over a predetermined threshold amount associated with a category of external event (e.g., a new law) based on categorized external context data 451 and categorized usage parameter data. In this example, the server 404 determines the contextual scenario (a new law) impacts network usage. In implementations, the predictive ML model is updated or trained with new usage parameter data and/or business context data on a continuous or periodic basis as new data becomes available. In embodiments, the ML module 422 of the server 404 implements step 503.

With continued reference to FIG. 5A, at step 504, the server 404 obtains real-time network usage data for one or more participating cloud environments (e.g., 406 and 408 of FIG. 4) and real-time business context data (e.g., internal context data and/or external context data 451). In aspects of the invention, the real-time network usage data includes information regarding ongoing and/or scheduled application activities (e.g., data transfer events) in the participating cloud environments. In aspects of the invention, the real-time network usage data is collected during the occurrence of one or more data migration events on one or more of the participating cloud environments (e.g., 406 and 408 of FIG. 4). In embodiments, the server 404 obtains (e.g., automatically via an application programming interface) the real-time network usage data from one or more application activity usage logs of the participating cloud environments (e.g., from job execution and usage log modules 430 or 430' of FIG. 4). The real-time usage data may include information regarding how much data is being migrated or is scheduled for migration, the type of data being transferred, the type of application activity, duration of application activities, etc. The server 404 may process the real-time network usage data to generate or derive usage parameter data in the manner described with respect to step 501. In embodiments, the data collection module 420 of the server 404 implements step 504.

At step 505, the server 404 inputs the real-time usage data (or usage parameter data) and business context data into the predictive ML model, which provides an output of assigned priority rankings for different application activities of the real-time usage data. In embodiments, the server 404 assigns different priority levels (e.g., high, medium, low) to different application activities of the real-time usage data based on predicted required bandwidth of the application activity, and predicted time required to pull or push data during the application activity, given an assumption of 100% bandwidth availability for the cloud environment at issue. In aspects of the invention, prioritizing workloads (application activities) with ML techniques ensures critical data feeds are timely processed, thereby ensuring business continuity within computing systems either during migration of data or during ongoing business management situations. In embodiments, the server 404 generates a corpus of predicted network usage knowledge based on the output of the predictive ML model (e.g., predicted bandwidth usage, predicted time for application activities, etc.). In implementations, the corpus of predicted network usage knowledge includes SLA information for each application and/or application activity and penalties (e.g., financial impacts) associated with any predicted breaches of the SLA (e.g., failure to meet SLA targets). In embodiments, the ML module 422 of the server 404 implements step 505.

At step 506, the server 404 predicts one or more contextual scenarios from the real-time business context data (internal and/or external context data 451) that are associated with changes in network usage using the predictive ML model. In embodiments, the predictive ML module uses incoming internal and/or external context data 451 and the real-time network usage data as inputs to output one or more contextual scenarios that are predicted to impact the predicted resource requirements of the cloud environment at issue based on the knowledge corpus of patterns or trends of network usage over time. In embodiments, the ML module 422 of the server 404 implements step 506.

At step 507, the server 404 allocates sets of computing resources in the participating cloud environments based on the assigned priority ratings. Allocation of computing resources may be in the form of scheduling application activities. In implementations, the server 404 determines an order of execution of the ongoing or scheduled application activities of a cloud environment at issue based on the assigned priority of the ongoing or schedule application activities, the predicted changes in network usage, predicted usage requirements of the ongoing or scheduled application activities, and SLA targets associated with the ongoing or scheduled application activities. In embodiments, the prioritizing and scheduling module 424 of the server 404 implements step 507. In implementations, step 507 includes one or more of the following substeps 507A-507E.

At step 507A, the server 404 determines the assigned priority rating of the ongoing or scheduled application activities.

At step 507B, the server 404 identifies any predicted changes in network usage based on the predictions of step 506.

At step 507C, the server 404 determines predicted bandwidth requirements, and duration of those requirements, for each of the ongoing or scheduled application activities over time based on the predictive ML model output. The anticipated bandwidth and computer resource requirements may include anticipated volumes of data to be pushed or pulled over time.

At step 507D, the server 404 determines predicted available bandwidth over time for the participating cloud environments based on the anticipated/predicted bandwidth requirements for the ongoing or scheduled application activities, a total amount of network bandwidth available for the participating cloud environment, and any predicted changes in network usage.

At step 507E, the server 404 identifies SLA targets associated with the ongoing or schedule application activities, and predicts any future failures to meet the SLA targets (e.g., available time to SLA breach) based on the predicted available bandwidth over time. In implementations, the server 404 also predicts a financial impact of the predicted future failures to meet the SLA targets.

With reference to FIG. 5B, at step 508, the server 404 initiates remediation protocols to meet anticipated bandwidth requirements and avoid breaching SLAs (i.e., failing to meet SLA targets). In embodiments, the prioritizing and scheduling module 424 of the server 404 implements step 508. Remediation protocols may include one or more of substeps 508A-C discussed below.

In aspect of the invention, an override rule-based model of the prioritizing and scheduling module 424 defines situations in which ongoing or scheduled application actions are to be re-prioritized, re-scheduled, and/or divided into multiple portions or steps. For example, the override rule-based model may include rules regarding different categories of application activities or actions, and how the different categories of application activities or actions are to be treated given situations where bandwidth availability is predicted to be: sufficient to meet predicted usage demands (e.g., considering the priority or time-sensitive nature of application actions); insufficient to meet predicted usage demands within a first threshold amount (e.g., a minor gap between available bandwidth and predicted bandwidth needs); and insufficient to meet predicted usage demands over the first threshold amount (e.g., a greater gap between available bandwidth and predicted bandwidth needs). In implementations, for any given contextual situation, if available bandwidth is insufficient to ensure the prevention of SLA breaches for each ongoing or scheduled application activity, the override rule-based model will initiate remediation protocols based on anticipated financial impacts due to one or more anticipated SLA breaches. For example, the override rules-based model may cause some application actions to be re-prioritized and rescheduled to avoid one or more potential breaches with the highest financial impact.

In embodiments, the remediation protocols include the substep 508A of re-prioritizing (updating priority levels for) the ongoing or scheduled application activities as needed to minimize or address anticipated SLA breaches or bandwidth shortfalls. In implementations, the server 404 re-prioritizes the ongoing or scheduled application activities based on financial impacts associated with anticipated failures to meets SLA targets, wherein step 508B may include rescheduling ongoing or scheduled application activities to minimize the financial impact of anticipated failures to meet SLA targets. In aspects of the invention, the server 404 re-prioritizes the ongoing or scheduled application activities based on the original prioritization level of the application actions, which may reflect how critical an application action is to a client system (e.g., client device 410). For example, in implementations, high priority level application actions will remain a priority, while lower priority application actions (e.g., medium priority) can be re-prioritized as low priority application actions in order to achieve scheduling goals of meeting client SLA targets based on predicted network usage and bandwidth availability.

In embodiments the server 404 is configured to identify whether one or more application activities can be parsed into multiple portions or steps. This enables the server 404 to schedule processing of application activity step (jobs) so that the applications can be made available to clients to meet SLA targets when available bandwidth is predicted to be too low to handle the processing of all application activities at the same time. In implementations, substep 508A includes dividing one or more application activities into multiple portions or steps, wherein the multiple portions or steps are prioritized individually and can be scheduled or rescheduled according to their individual priority level. In aspects of the invention, the server 404 utilizes stored predetermined rules indicating categories of application activities that can be divided into portions or steps, to determine ongoing or scheduled application activities that can be divided, according to their classification. This enables the processing of partial data so that multiple applications can be supported based on predicted available bandwidth and SLA targets of the applications.

In embodiments, the remediation protocols include the substep 508B of scheduling or rescheduling the ongoing or scheduled application activities as needed based on the priority levels (or updated priority levels) of the ongoing or scheduled application activities in order to meet anticipated bandwidth requirements and avoid failures to meet SLA targets. In embodiments, substep 508B includes sending instructions to one or more remote scheduling tools of one or more participating cloud environments (e.g., scheduling modules 431 and 431' of FIG. 4) to automatically reschedule ongoing or scheduled application activities according to the instructions. In other embodiments, substep 508B includes automatically rescheduling ongoing or scheduled application activities using a local scheduling tool (e.g., the prioritizing and scheduling module 424). In implementations, substep 508B includes scheduling or rescheduling portions or steps of one or more application activities according to their individual priority level.

In embodiments, step 508 includes the substep 508C of automatically initiating expansion of network bandwidth or computer resources to meet the anticipated bandwidth requirements and avoid failures to meet SLA targets. In embodiments, step 508 comprises the server 404 sending instructions to one or more remote computing devices of the environment 400 (e.g., bandwidth provider 414) to initiate changes to network usage capacity (e.g., increases in bandwidth) for one or more cloud environments (e.g., 406, 408).

Based on the above, it can be understood that embodiments of the invention provide an AI enabled network bandwidth management system (e.g., server 404) configured to predict the data consumption need (application data pushing to or pulling from cloud server or any cloud migration activity) in different contextual situations. Different contextual situations may include business priority, priority of consumption needs, and timing (e.g., time of month, quarter of the year, holiday, timing concurrent with major internal or external event, etc.). Additionally, embodiments of the AI enabled network bandwidth management system are configured to reprioritize and/or reschedule cloud related application activities (application data pushing to or pulling from cloud server or any cloud migration activity) to ensure SLA targets are met and penalties are avoided with various application activities. In implementations, the AI enabled network bandwidth management system is trained using historic data from previous production migrations, changes in production cycle times, and/or migrations completed in a test environment.

Advantageously, based on available bandwidth, embodiments of the AI enabled network bandwidth management system are configured to predict the priority of application activities, predict whether the application activities can be performed within defined SLA guidelines (e.g., meet SLA targets), and respond accordingly to ensure available bandwidth is sufficient to meet the needs of the application activities and avoid SLA breaches.

Another advantage of the AI enabled network bandwidth management system according to embodiments of the invention, is the ability of the system to analyze various internal and external influencing factors (contact data) that drive the priority of the cloud related application activities. That is, based on predicted contextual situations (e.g., by analyzing various internal and external influencing factors), time available to SLA breach, volume of work, etc., embodiments of the invention are configured to identify the priority of cloud related activities based on a ML analysis over time of how various internal and external factors (context data) are likely to affect the priority of different cloud related activities.

Figure 6:
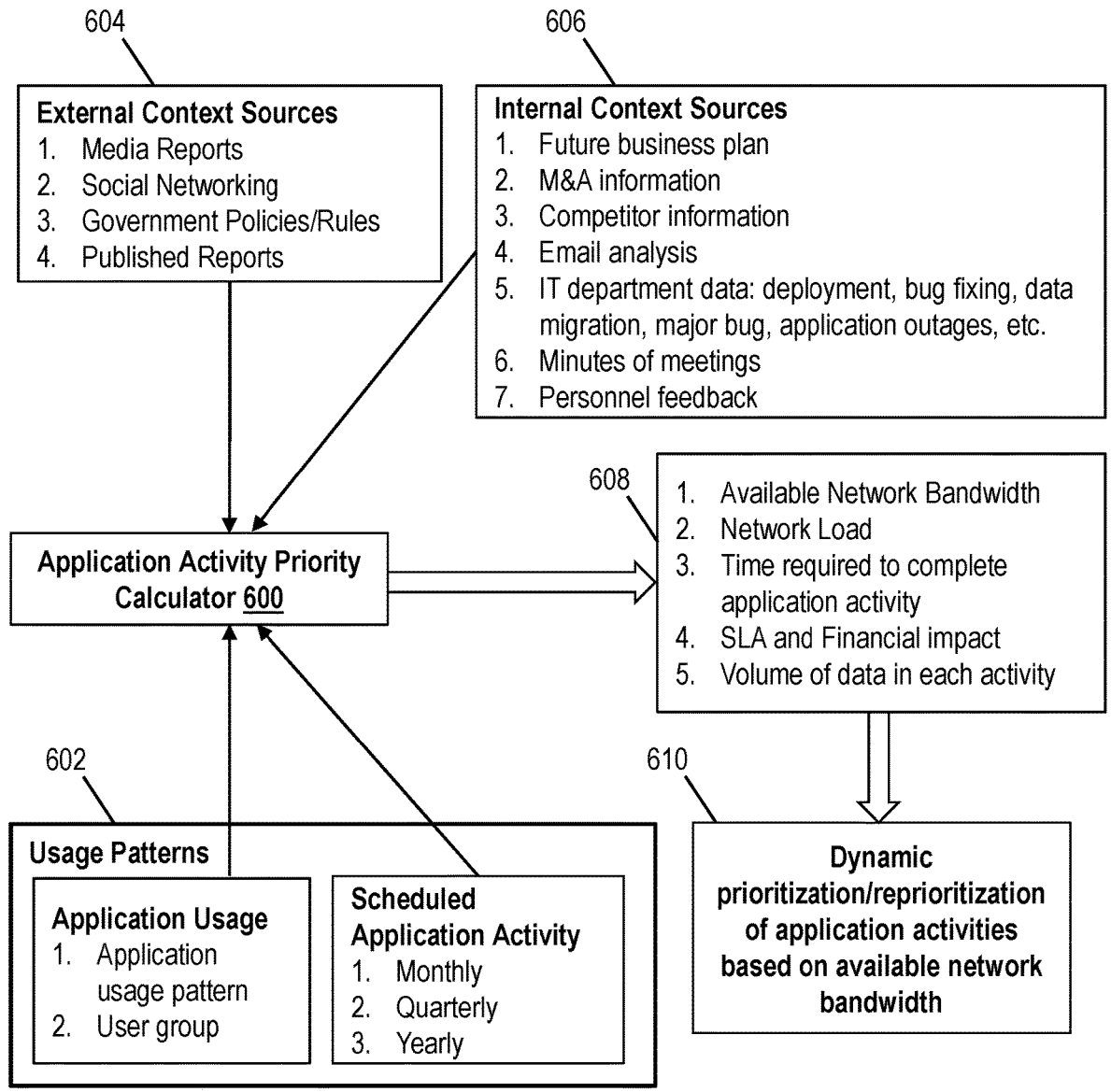
FIG. 6 illustrates an exemplary use scenario in accordance with aspects of the present invention.

FIG. 6 illustrates an exemplary use scenario in accordance with aspects of the present invention. Steps illustrated in FIG. 6 may be carried out in the environment of FIG. 4 and are described with reference to elements depicted in FIG. 4.

In the example of FIG. 6, the server 404 acts as an application activity priority calculator 600 for one or more cloud environments (e.g., cloud environments 406 and 408). In implementations, the application activity priority calculator 600 obtains information regarding usage patterns from the one or more cloud environments, as represented at 602. The information regarding usage patterns 602 may include software application usage information such as application usage patterns and user groups associated with the software applications, and timing information associated with schedule application activities, such as application activities initiated monthly, quarterly, and yearly.

In implementations, the application activity priority calculator 600 also obtains external business context data from external context sources represented at 604, and internal business context data from internal context sources represented at 606. Exemplary external business context data may include: media reports, social networking, government policies/rules and published reports. Exemplary internal business context data may include: future business plans, M&A information, competitor information, email analysis information, IT department data (e.g., deployment, bug fixing, data migration, major bug information, application outages, etc.), minutes of meetings and personnel feedback.

In implementations, the application activity priority calculator 600 utilizes the information collected to determine usage parameters 608 including: available network bandwidth, network load, time required to complete application activities, SLA and financial impact from SLA breaches, and volume of data in each application activity. With this information, the application activity priority calculator 600 may dynamically prioritize and/or reprioritize ongoing or scheduled application activities of a cloud environment at issue based on the available network bandwidth in accordance with embodiments of the invention, as indicated at 610.

In embodiments, a service provider could offer to perform the processes described herein. In this case, the service provider can create, maintain, deploy, support, etc., the computer infrastructure that performs the process steps of the invention for one or more customers. These customers may be, for example, providers of cloud-based software applications who have an interest in managing computing resources to meet SLA targets of customers. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   training, by a computing device, a predictive machine learning (ML) model based on historic network usage data of software applications in a cloud environment and historic business context data to identify relationships between parameters including the historic network usage data of the software applications and categories of the historic business context data and to identify trends between particular internal or external business context data and network usage parameters;
   assigning, by the computing device, priority rankings to software application activities of the cloud environment using the predictive ML model based on relationships of predicted resource requirements for the software application activities of the cloud environment and predicted contextual scenarios that impact the predicted resource requirements using an input of real-time network usage data of the cloud environment and real-time business context data,
   wherein the predicted resource requirements include service level agreement (SLA) information for each of the software applications and penalties for breaches of SLA of each of the software applications; and
   initiating, by the computing device, scheduling of the software application activities based on the priority rankings.

2. The method of claim 1, further comprising:
   dynamically predicting, by the computing device, the predicted resource requirements for the software application activities of the cloud environment using the predictive ML model based the input of the real-time network usage data of the cloud environment; and
   predicting, by the computing device, the contextual scenarios that impact the predicted resource requirements based on the predictive ML model using the real-time business context data as the input;
   wherein the predicted resource requirements comprise network bandwidth requirements and the contextual scenarios are each based on a time.

3. The method of claim 1, further comprising:
   obtaining, by the computing device, SLA targets associated with participants in the cloud environment;
   wherein the assigning the priority rankings is further based on the cloud environment meeting the SLA targets.

4. The method of claim 3, further comprises:
   predicting, by the computing device, that at least one of the SLA targets will be breached; and
   initiating, by the computing device, at least one remedial protocol to avoid the breaching of the at least one of the SLA targets based on stored rules, wherein the at least one remedial protocol is selected from the group consisting of: parsing one or more application activities into portions; re-prioritizing the one or more application activities or the portions; rescheduling the one or more application activities or the portions; and initiating expansion of the network bandwidth for the cloud environment.

5. The method of claim 3, further comprising: determining, by the computing device, at least one financial impact associated with breaching the at least one of the SLA targets, wherein the initiating the at least one remedial protocol is based on the at least one financial impact.

6. The method of claim 1, wherein the historic business context data is selected from the group consisting of: media reports; social networking information; government policies or rules; published reports; future business plans; mergers and acquisitions information; competitor information, email information; information technology data; minutes from meetings; and personnel feedback.

7. The method of claim 1, wherein the real-time network usage data of the cloud environment includes: ongoing and scheduled application activities for the cloud environment; and current network bandwidth availability.

8. The method of claim 1, wherein the historic network usage data of the software applications includes a volume of data required for various types of software application activities and a time required for the various types of software application activities.

9. The method of claim 1, wherein the computing device includes software provided as a service in a cloud environment and further comprising:
   overriding a rule-based model of the priority rankings and scheduling to define situations in which ongoing or scheduled application actions are at least one of re-prioritized, re-scheduled, and divided into multiple portions or steps.

10. A computer program product comprising one or more computer readable storage media having program instructions collectively stored on the one or more computer readable storage media, the program instructions executable to:
    obtain real-time network usage data for one or more participating cloud environments collected during occurrence of one or more data migration events on one or more participating from one or more application activity usage logs of the participating cloud environments real-time business context data from one or more remote sources;
    train a predictive machine learning (ML) model based on the real-time network usage data of software applications in the participating cloud environments and the real-time business context data to identify relationships between parameters including the real-time network usage data and the real-time business context data;
    dynamically predict network bandwidth requirements for software application activities of the participating cloud environments and a duration of the predicted network bandwidth requirements using the predictive ML model based on an input of the real-time network usage data of the participating cloud environments;

predict one or more contextual scenarios that impact the predicted network bandwidth requirements using the predictive ML model based on an input of the real-time business context data;

assign priority rankings to the software application activities based on the predicted network bandwidth requirements, the duration of the predicted network bandwidth requirements, and the predicted contextual scenarios using the predictive ML model, wherein the predicted network bandwidth requirements include service level agreement (SLA) information for each of the software applications and penalties for breaches of SLA of each of the software applications; and initiate scheduling of the software application activities based on the priority rankings.

11. The computer program product of claim 10, wherein the contextual scenarios are based on a time.

12. The computer program product of claim 10, wherein the program instructions are further executable to: obtain SLA targets associated with participants in the cloud environment;

wherein the assigning the priority rankings is further based on the cloud environment meeting the SLA targets.

13. The computer program product of claim 12, wherein the program instructions are further executable to:

predict that at least one of the SLA targets will be breached; and initiate at least one remedial protocol to avoid the breaching of the at least one of the SLA targets based on stored rules, wherein the at least one remedial protocol is selected from the group consisting of: parsing one or more application activities into portions; re-prioritizing the one or more application activities or the portions; rescheduling the one or more application activities or the portions; and initiating expansion of the network bandwidth.

14. The computer program product of claim 12, wherein the program instructions are further executable to: determine financial impacts from breaching the at least one of the SLA targets, wherein the initiating the at least one remedial protocol is based on the financial impacts.

15. The computer program product of claim 10, wherein the real-time network usage data of the participating cloud environments includes: ongoing and scheduled application activities for the cloud environment; and current network bandwidth availability and further comprising:

overriding a rule-based model of the priority and scheduling to define situations in which ongoing or scheduled application actions are at least one of re-prioritized, re-scheduled, and divided into multiple portions or steps.

16. The computer program product of claim 10, wherein the historic network usage data of the software applications includes a volume of data required for various types software application activities and a time required for the various types of software application activities.

17. A system comprising:

a processor, a computer readable memory, one or more computer readable storage media, and program instructions collectively stored on the one or more computer readable storage media, the program instructions executable to:

obtain historic business context data from one or more remote sources;

train a predictive machine learning (ML) model based on historic network usage data of software applications in a cloud environment and the historic business context data to identify relationships between parameters including the historic network usage data and the historic business context data;

dynamically predict network bandwidth requirements for software application activities of the cloud environment and a duration of the predicted network bandwidth requirements based on the predictive ML model, during an ongoing data migration event within the cloud environment, using an input of real-time network usage data of the cloud environment;

predict one or more contextual scenarios that impact the predicted network bandwidth requirements that are associated with changes in network usage based on the predictive ML model using an input of real-time business context data;

assign priority rankings to the software application activities based on the predicted network bandwidth requirements, the duration of the predicted network bandwidth requirements, and the predicted contextual scenarios using the predictive ML model, wherein the predicted network bandwidth requirements include service level agreement (SLA) information for each of the software applications and penalties for breaches of SLA of each of the software applications;

dynamically initiate scheduling of the software application activities during the ongoing data immigration event based on the priority rankings; and override a rule-based model of the priority and scheduling to define situations in which ongoing or scheduled application actions are at least one of re-prioritized, re-scheduled, and divided into multiple portions or steps.

18. The system of claim 17, wherein the program instructions are further executable to:

obtain SLA targets associated with participants in the cloud environment;

wherein the assigning the priority rankings is further based on the cloud environment meeting the SLA targets; and the override rule-based model includes rules regarding different categories of application activities or actions and how the different categories of application activities or actions are treated given situations where bandwidth availability is predicted to be:

sufficient to meet predicted usage demands;

insufficient to meet predicted usage demands within a first threshold amount; and insufficient to meet predicted usage demands over the first threshold amount; and the override rule-based model will initiate remediation protocols based on anticipated financial impacts due to one or more anticipated SLA breaches or bandwidth shortfalls.

19. The system of claim 18, wherein the program instructions are further executable to:

predict that at least one of the SLA targets will be breached;

initiate at least one remedial protocol to avoid the breaching of the at least one of the SLA targets based on stored rules, wherein the at least one remedial protocol is selected from the group consisting of: parsing one or more application activities into portions; re-prioritizing the one or more application activities or the portions; rescheduling the one or more application activities or the portions; and initiating expansion of the network bandwidth; and the dividing into multiple portions or steps further comprises prioritizing individually each of the multiple portions or steps and scheduling or rescheduling according to their individual priority.

20. The system of claim 19, wherein the program instructions are further executable to: determine financial impacts from breaching the at least one of the SLA targets, wherein the initiating the at least one remedial protocol is based on the financial impacts.

* * * * *